(12) United States Patent
Damarla

(10) Patent No.: US 9,689,966 B2
(45) Date of Patent: Jun. 27, 2017

(54) SYSTEM AND METHOD FOR IDENTIFYING LOCATION OF GUNFIRE FROM A MOVING OBJECT

(71) Applicant: U.S. Army Research Laboratory ATTN: RDRL-LOC-I, Washington, DC (US)

(72) Inventor: Thyagaraju Damarla, Laurel, MD (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 0 days.

(21) Appl. No.: 15/086,125

(22) Filed: Mar. 31, 2016

(65) Prior Publication Data

US 2016/0334500 A1  Nov. 17, 2016

Related U.S. Application Data

(60) Provisional application No. 62/143,835, filed on Apr. 7, 2015.

(51) Int. Cl.
*G01S 5/22* (2006.01)
*H04R 29/00* (2006.01)
*H04R 3/00* (2006.01)

(52) U.S. Cl.
CPC .............. *G01S 5/22* (2013.01); *H04R 3/005* (2013.01); *H04R 2499/13* (2013.01)

(58) Field of Classification Search
CPC .. H04R 3/005; H04R 29/008; H04R 2430/21; H04R 2499/13
See application file for complete search history.

(56) References Cited

U.S. PATENT DOCUMENTS

| | | | | |
|---|---|---|---|---|
| 6,847,587 B2* | 1/2005 | Patterson | ................ | F41H 11/00 367/127 |
| 7,266,045 B2* | 9/2007 | Baxter | ...................... | G01S 5/22 367/124 |
| 8,437,223 B2* | 5/2013 | Barger | .................... | F41G 3/147 367/129 |
| 8,817,577 B2* | 8/2014 | Azimi-Sadjadi | ........ | G01S 11/14 367/118 |
| 2010/0278347 A1* | 11/2010 | Succi | ..................... | H04R 3/005 381/56 |

* cited by examiner

*Primary Examiner* — Brenda Bernardi
(74) *Attorney, Agent, or Firm* — Alan I. Kalb

(57) ABSTRACT

A system and method for identifying the location of gunfire from a moving object in which at least two spaced apart microphones are positioned on the moving object. The output from the microphones is decomposed into intrinsic mode functions by using empirical mode decomposition. A transient pulse is then identified in the intrinsic mode function representative of the gunfire. The location of the origin of the gunfire is then determined from the transient pulses through multilateration using time difference of arrival of the transient pulses by the microphones.

14 Claims, 8 Drawing Sheets

SYSTEM AND METHOD FOR IDENTIFYING LOCATION OF GUNFIRE FROM A MOVING OBJECT

CROSS-REFERENCE TO RELATED APPLICATIONS

This application claims priority of U.S. Provisional Application 62/143,853 filed Apr. 7, 2015, the contents of which are incorporated herein by reference.

GOVERNMENT INTEREST

The invention described herein may be manufactured, used, and licensed by or for the United States Government.

BACKGROUND OF THE INVENTION

I. Field of the Invention

The present invention relates to a method for determining the location of gunfire from a moving object.

II. Description of Related Art

The location of gunfire, especially sniper gunfire, is an active research area for the military. Currently, there are several commercial systems that are available on the market that detect gunfire and determine the location of the source of the gunfire, typically through multilateration using time difference of arrival (TDOA) of the gunshot received by an array of microphones.

These previously known commercial systems, however, are for the most part stationary systems although, in one case, the gunshot localization system is soldier worn. In either case, the gunshot localization system is generally arranged in an area that is audibly quiet. As such, the identification of gunfire by the system is a simple and straightforward process.

While the previously known systems operate satisfactorily when deployed in an acoustically quiet position, none of these previously known systems work satisfactorily when used on a moving vehicle. In particular, moving vehicles, such as jeeps, tanks, armored vehicles, etc., all generate a great deal of noise not only from the vehicle engine and drive train, but also wheel/tire noise from their engagement with the ground. Furthermore, since such microphones would necessarily be mounted on the outside of the vehicle, such microphones would be subject to airflow noise which only increases with the increasing speed of the vehicle.

As a result, the whole vehicle platform is subject to vibrations that resonate in the body of the vehicle. These platform noises are also detected by the vehicle mounted acoustic microphones of the type typically used for gunfire detection.

As a result, the noise from distant gunfire becomes lost in the various vehicle noises. When this occurs, isolation of the gunfire signal from the other vehicle noises is very difficult and results in a large number of false alarms.

SUMMARY OF THE PRESENT INVENTION

The present invention provides a method for identifying the location of gunfire from a moving object, such as a vehicle, which overcomes the above-mentioned disadvantages of the previously known systems.

In brief, the present invention utilizes Time Difference of Arrival (TDOA) of Gunshot signals at multiple, at least three, and preferably four or more, spaced wide apart audio microphones positioned on the exterior of the moving object, such as the vehicle. Each microphone produces an output signal representative of all received audio signals over a range of audio frequencies.

Majority of the false alarms arise mainly due to the inability of existing techniques to find the gunshot signal in midst of the noise. Searching for the gunshot signal in the noise is like trying to find a needle in a haystack. This invention provides a method and approach to find the whereabouts of the gunshot signals in the noise. Once the location where the gunshot signals lie is determined, one can use generalized cross-correlation techniques presented in C. H. Knapp and C. Carter, "The generalized correlation method for estimation of time delay", *IEEE Trans. on Acoustics. Speech and Signal Processing*, Vol. ASSP-24, No. 4, August 1976, pp. 320-327 to estimate the TDOAs between pairs of microphones. These TDOAs are then used to localize the place where the gunshot is fired from by using well known techniques presented in Y. T. Chan and K. C. Ho, "A simple and efficient estimator for hyperbolic location", *IEEE Transactions on Signal Processing*, Vol. 42, August 1994, pp. 1905-1915.

The gunshot signal is very transient in nature and lasts less than few milliseconds. So finding such a transient pulse in noise is very difficult. However, the gunshot signal is accompanied by multipath signals (gunshot signals bounced off by various objects, such as ground, trees, objects, buildings, etc.). These multipath signals occur after the main signal due to direct path and have low amplitudes as they are bounced off of various objects with different reflection coefficients. These multipath signals persist considerably longer period of time than the direct gunshot signal as they travel different paths with different path lengths. In order to detect the gunshot signal which occurs just prior to the multipath signals, we first find where these multipath signals are.

The multipath signals manifest themselves as fast varying small fluctuations riding the noise. A special signal processing technique called "Empirical Mode Decomposition (EMD)" is used to find these fast varying fluctuations riding the noise. Once the where about of the multipath signals are determined, the gunshot signal just precedes them, hence able to detect the gunshot. Once the gunshot signal location is determined, the TDOAs between pairs of microphones are determined which in turn used to find the location where the gunshot was fired from.

In order to find the signals due to multipath, the audio output signals from the microphones are decomposed into intrinsic mode functions (IMFs) by using empirical mode decomposition. Just like the Fourier transform of a time domain signal decomposes it into some of cosine and sine function, the EMD decomposes a given signal into sum of IMFs. The first intrinsic mode function consists of fast varying components of the original signal, as will be further illustrated in the invention disclosure.

The transient pulses from the microphones are then used to estimate the TDOAs which are then used to locate the position of the gunfire through multilateration.

BRIEF DESCRIPTION OF THE DRAWING

A better understanding of the present invention will be had upon reference to the following detailed description when read in conjunction with the accompanying drawing, wherein like reference characters refer to like parts throughout the several views, and in which.

DETAILED DESCRIPTION OF A PREFERRED EMBODIMENT OF THE PRESENT INVENTION

Figure 1:
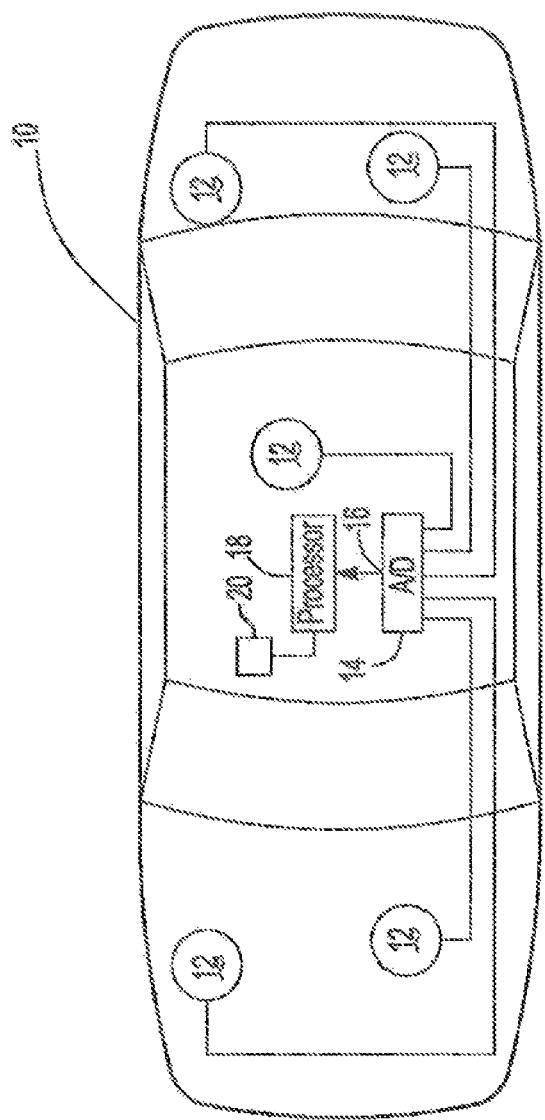
FIG. 1 is an elevational view illustrating a vehicle equipped with the system of the present invention.

With reference first to FIG. 1, a vehicle 10 is shown. The vehicle 10 may be any sort of vehicle, such as a jeep, armored vehicle, tank, and/or the like, and preferably is of the type of vehicle used by the military. The vehicle 10 further has at least two, and preferably three or more, audio microphones 12 that are attached to the outside of the vehicle 10. Each microphone produces an output signal representative of all received audio sound over the audio spectrum of the microphone.

The outputs from each microphone 12 are coupled as input signals to an interface 14, such as an analog/digital (A/D) converter 14. In the well-known fashion, the A/D converter 14 converts the received analog audio signals from the microphones 12 and converts these audio signals into a digital output from the A/D converter 14. That output 16 is coupled as an input signal to a processor 18. In a fashion to be subsequently described in greater detail, the processor 18 is programmed to not only identify distant gunfire using the audio inputs from the microphones 12, but to also locate the source of the gunfire relative to the vehicle 10. The processor 18 then generates an output signal to a display device 20 which is visible to personnel in the vehicle 10.

Figure 2:
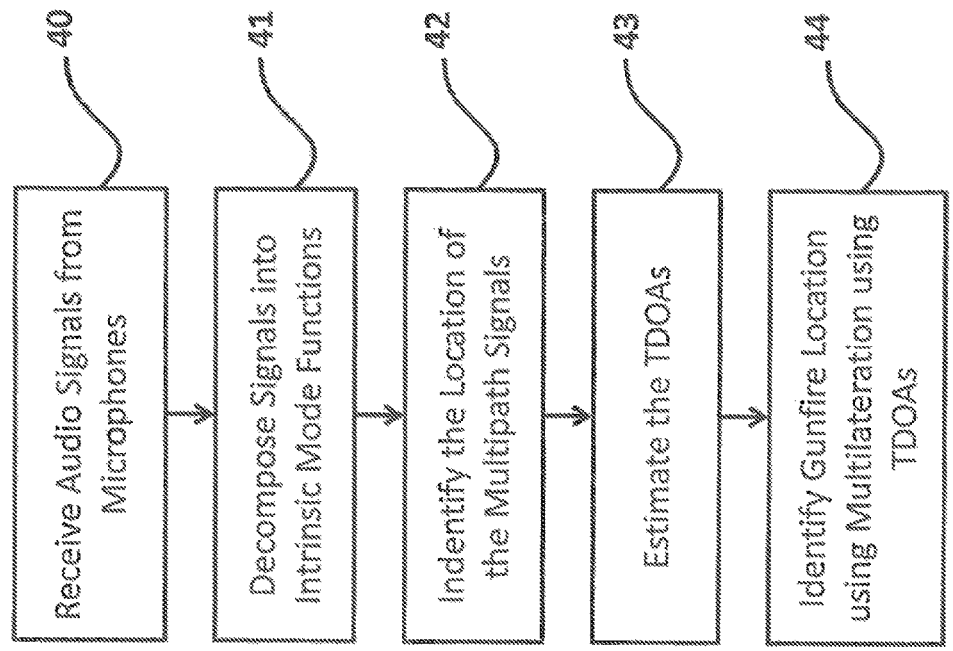
FIG. 2 is a flowchart illustrating the algorithm of the present invention.
Figure 3:
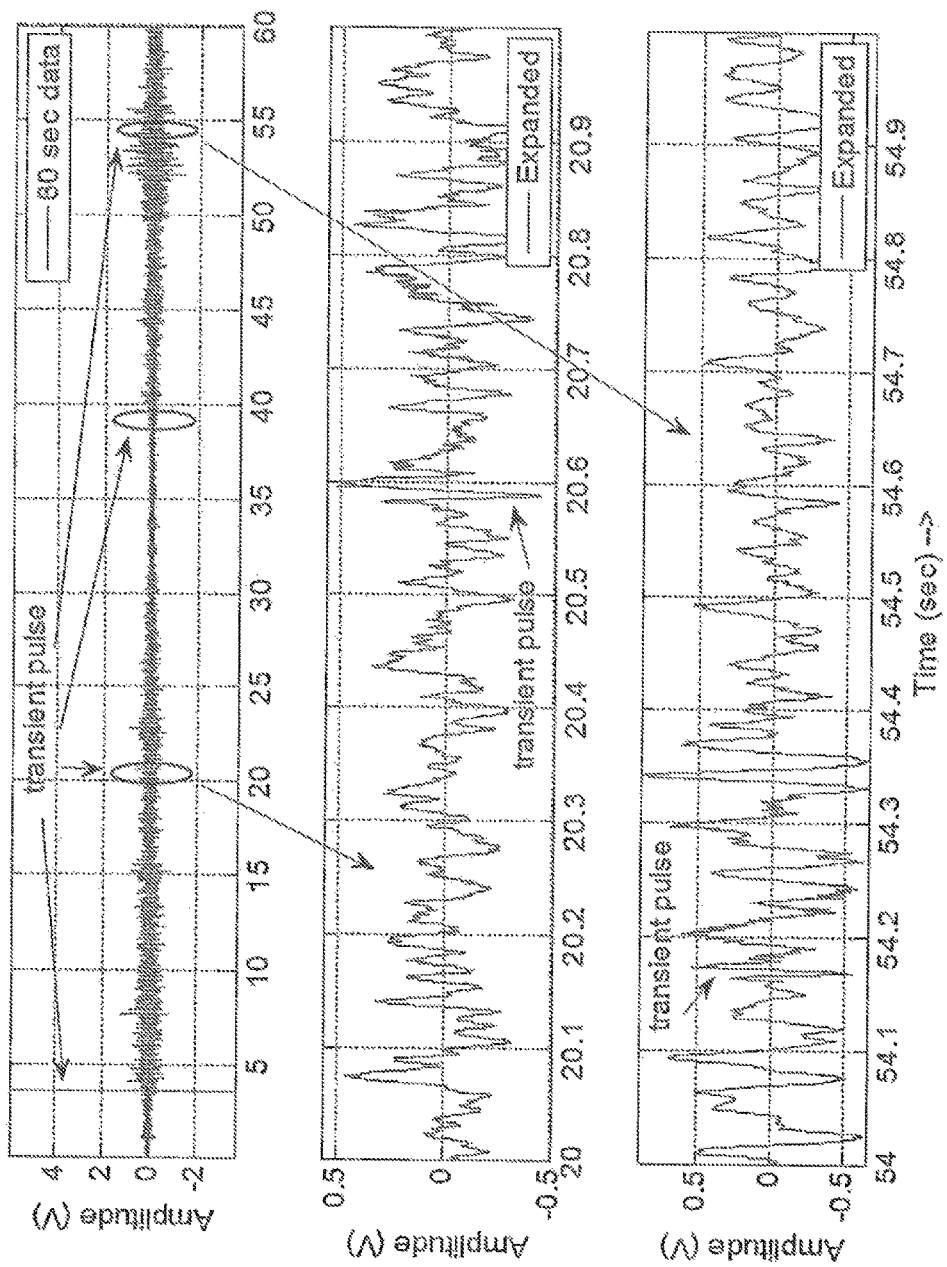
FIG. 3 is a graph illustrating sample data collected by a microphone with four transient pulses, representative signal corresponding to gunshot, at different speeds of vehicle.

With reference now to FIG. 2, the processor 18 is programmed to receive the audio signals from the microphones 12 at step 40. Although any conventional method may be utilized to receive the now digitized audio signals from the microphones 12 and to store those signals for access by the processor 18, preferably, a WaveBook data acquisition system is used to acquire the audio signals. An exemplary sampling rate of 4000 samples per second is sufficient to provide rapid localization of the gunfire using muzzle blast signals and display that localization on the display 20. For supersonic bullets, one may want to capture the shockwave signals for localizing the gunfire. In which case the sampling rate in excess of 20 K samples per second will be used to capture the shockwave. After the digitized audio signals are received at step 40, step 40 proceeds to step 42. FIG. 3 shows the signals captured by one of the microphones mounted on a vehicle traveling at 25-30 miles per hour. The first transient pulse shown at about 4 sec is clearly above noise as the distance between the vehicle and the source of gunfire (or loud noise generator) is only 60 meters. Other three pulses are buried in noise. Enlarged portions of the signals at 20 and 50 sec marks are shown also in FIG. 3.

Figure 4:
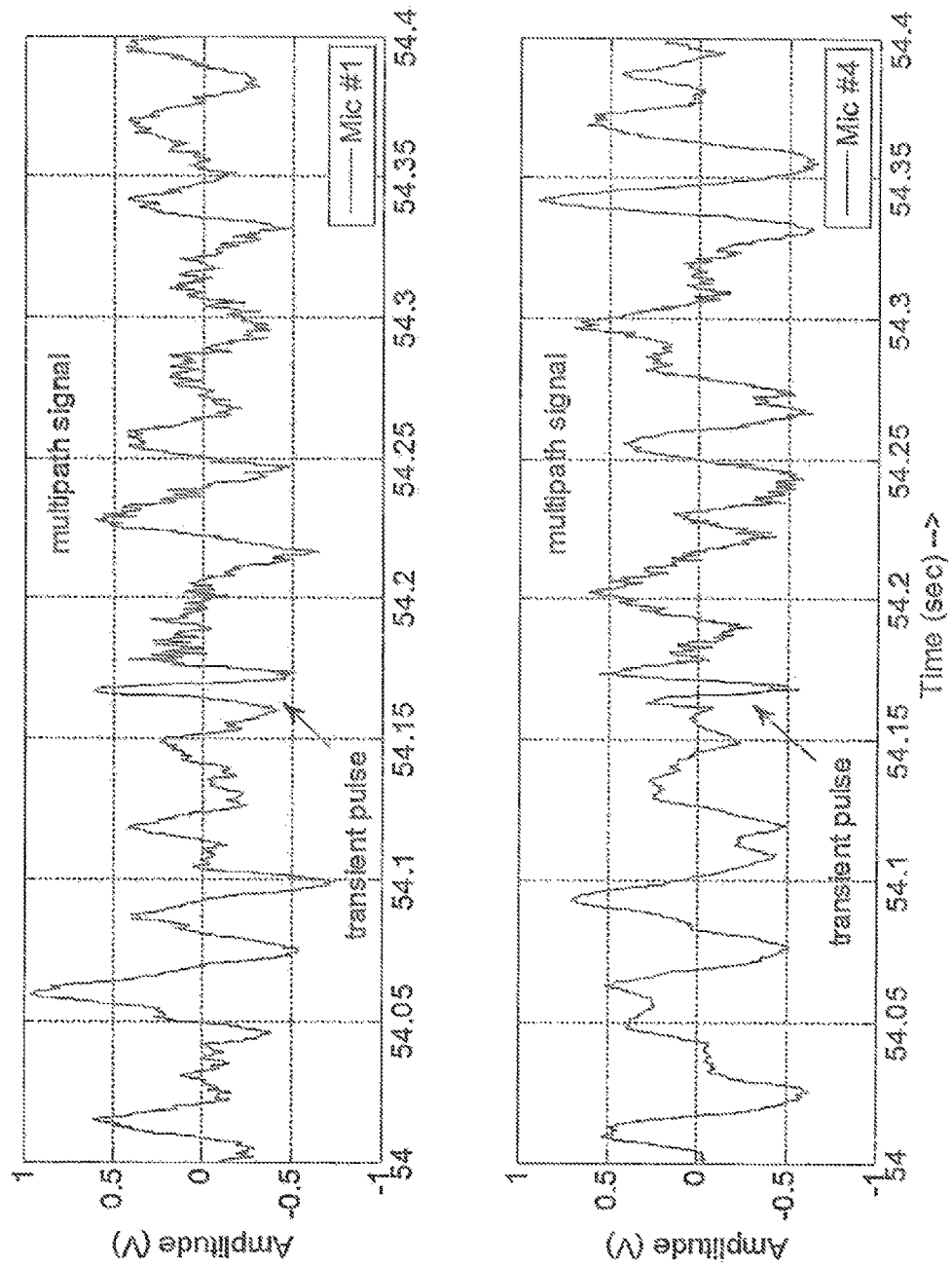
FIG. 4 is a graph illustrating the signal received by two microphones clearly showing multipath signals riding the noise immediately after the transient pulse.

The gunshot localization requires the time difference of arrival (TDOA) of muzzle blast signal (transient pulse) at multiple microphones. In order to determine the TDOAs between pairs of microphones, the muzzle blast signals should be detected. However, detection of muzzle blast signals in the presence of platform and flow noise is difficult. But if we know where they might be, detection would be easy. Each muzzle blast signal is followed by the multipath signals (that is, muzzle blast signals bounced off by various objects). The signal received by each microphone can be represented as:

s(t) captured by a microphone due to gunfire as sum of multiple components:

$$s(t) = A_0 x(t) + \sum_{i=1}^{M} A_i x(t + \tau_i) + n(t) \tag{1}$$

where x(t) is the muzzle blast signal emitted by the gun and $x(\tau+\tau_i)$ is the $i^{th}$ multipath signal received by the microphone, $A_i$ is its amplitude and n(t) is the noise. The first component $A_0 x(t)$ in Equation 1 is the direct path signal received by the microphone and its amplitude $A_0$ is predominant compared to multipath signal amplitudes $A_i$. The multipath signals arrive after the direct path signal and superimpose on the noise. This is seen in FIG. 4 clearly as additional fluctuations in noise immediately after the occurrence of transient pulse. This feature is used to localize the occurrence of the transient event, i.e., the time when the additional fluctuations in signal occur is identified. In order to detect these additional fluctuations due to multipath, we decompose the received signal into its intrinsic mode functions using empirical mode decomposition (EMD).

Figure 5:
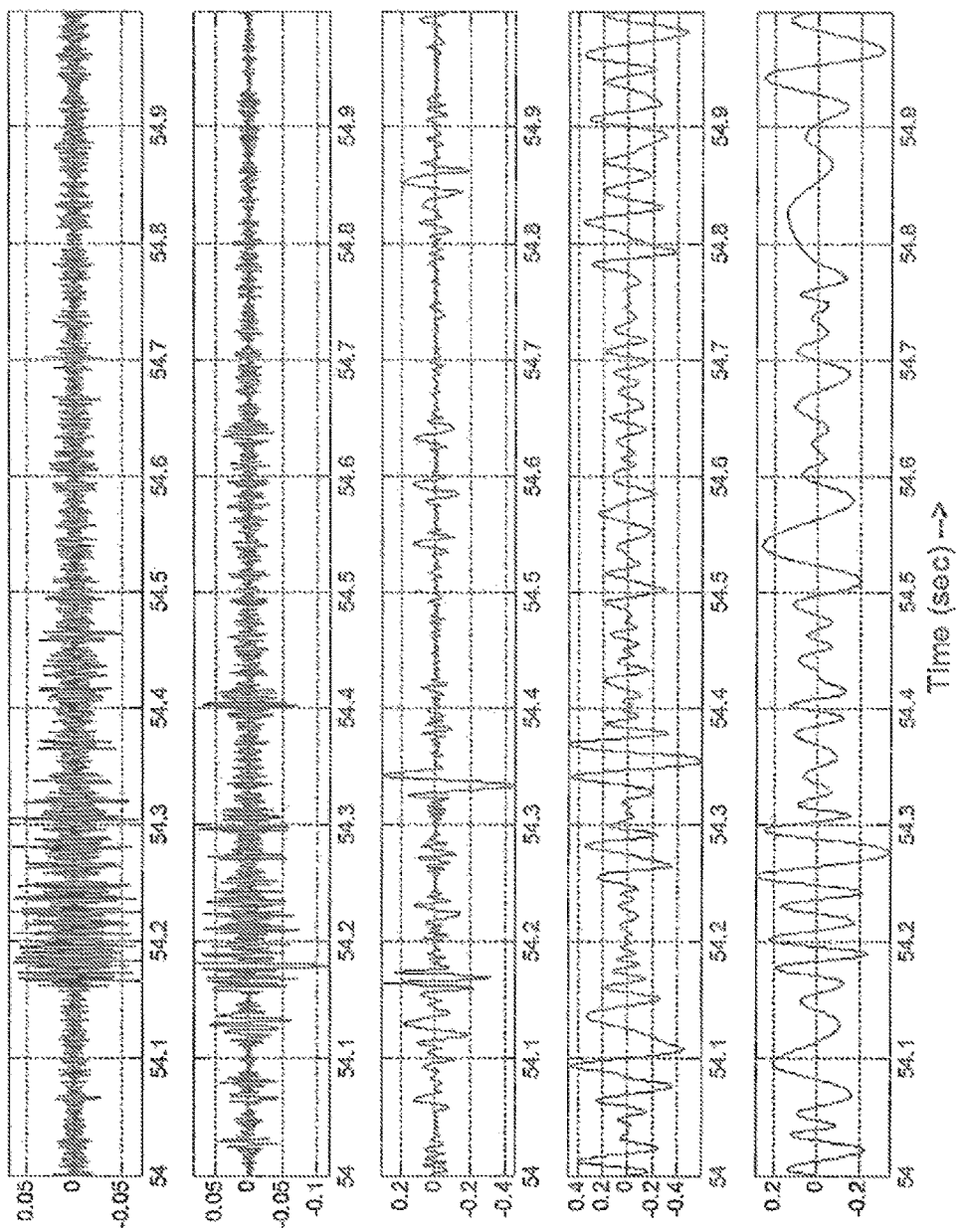
FIG. 5 is a graph of the decomposition of the audio signal into five intrinsic mode functions.
Figure 6:
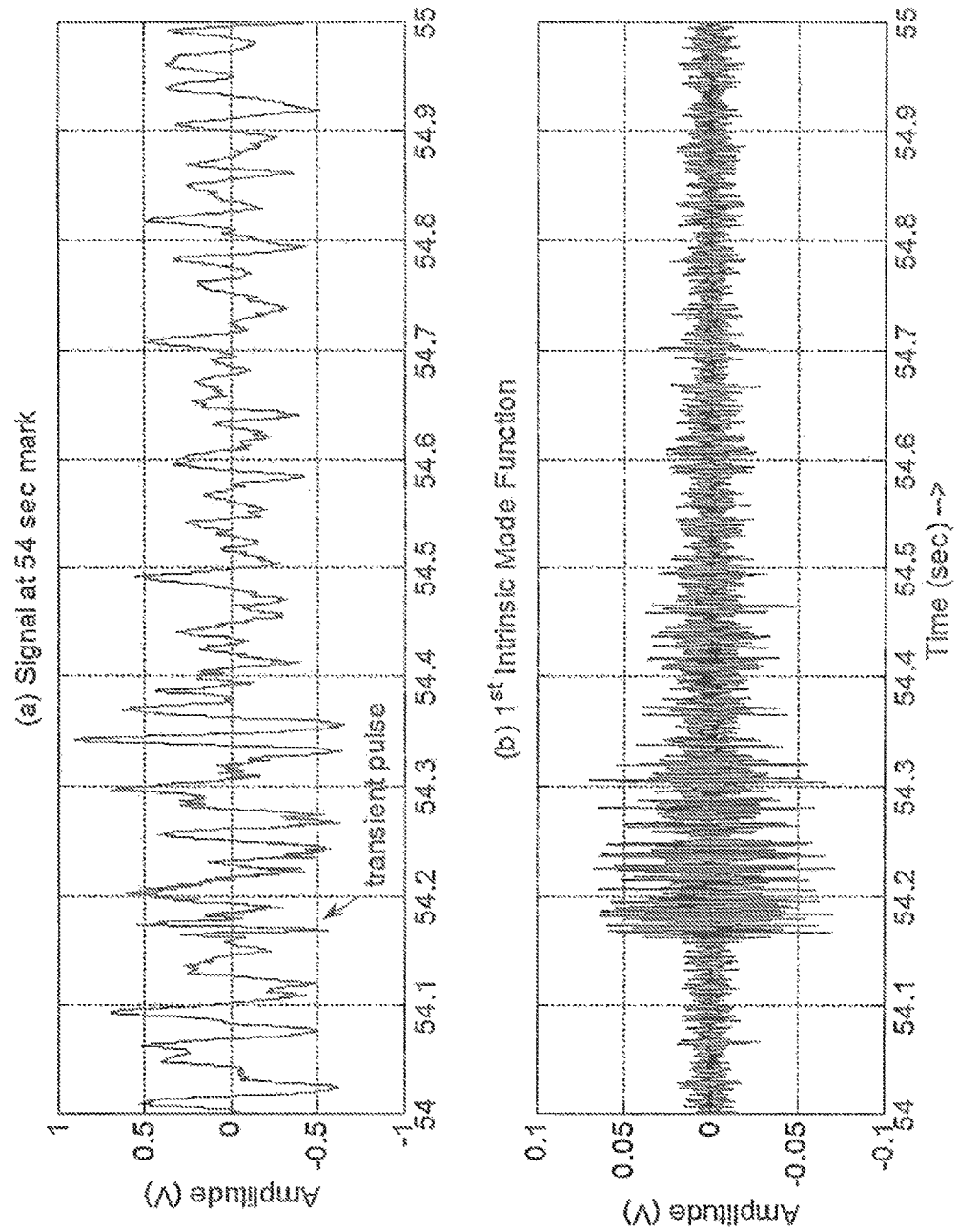
FIG. 6 is a time graph of the identified transient pulse (gunshot) from one microphone and the multipath signals extracted (first intrinsic mode function) using EMD.

At step 41 in FIG. 2 the processor 18 decomposes the received audio signals into intrinsic mode functions utilizing empirical decomposition which is based on the direct extraction of the energy associated with the various intrinsic time scales. Furthermore, the intrinsic mode functions have well behaved Hilbert transforms from which the instantaneous frequencies can be calculated. FIG. 5 shows the decomposition of a signal at the 54 sec mark shown in the upper half of FIG. 4 into five intrinsic mode functions. In FIG. 6, the signal at the 54 sec mark and its first intrinsic mode function is shown. From this figure, we can see the multipath signals are extracted clearly by the first intrinsic mode function with higher amplitudes than the noise prior to the occurrence of transient pulse.

At step 44, the processor 18 identifies the location where the multipath signals are present due to muzzle blast travelling different paths. The algorithm used for determining the location is given below:

1. Let $s_i$ be the signal corresponding to microphone $i \in \{1, 2, \ldots, n\}$, where "n" denotes the number of microphones.
2. Let $e_i = emd(s_i)$, where "emd" is the empirical mode decomposition of signal $s_i$ and $e_i = [e_i^1, e_i^2, \ldots, e_i^m]^r$ is a matrix of "m" intrinsic mode functions.
3. Compute $g = \Pi_{j=1}^{n} e_i^1$.
4. Set $G(t)=1$ if $g(t) \geq \tau$ else $G_i(t)=0$, where $\tau$ is some threshold and G(t) is set to 1 only if the time interval $t > 0.1$ sec.

Figure 7:
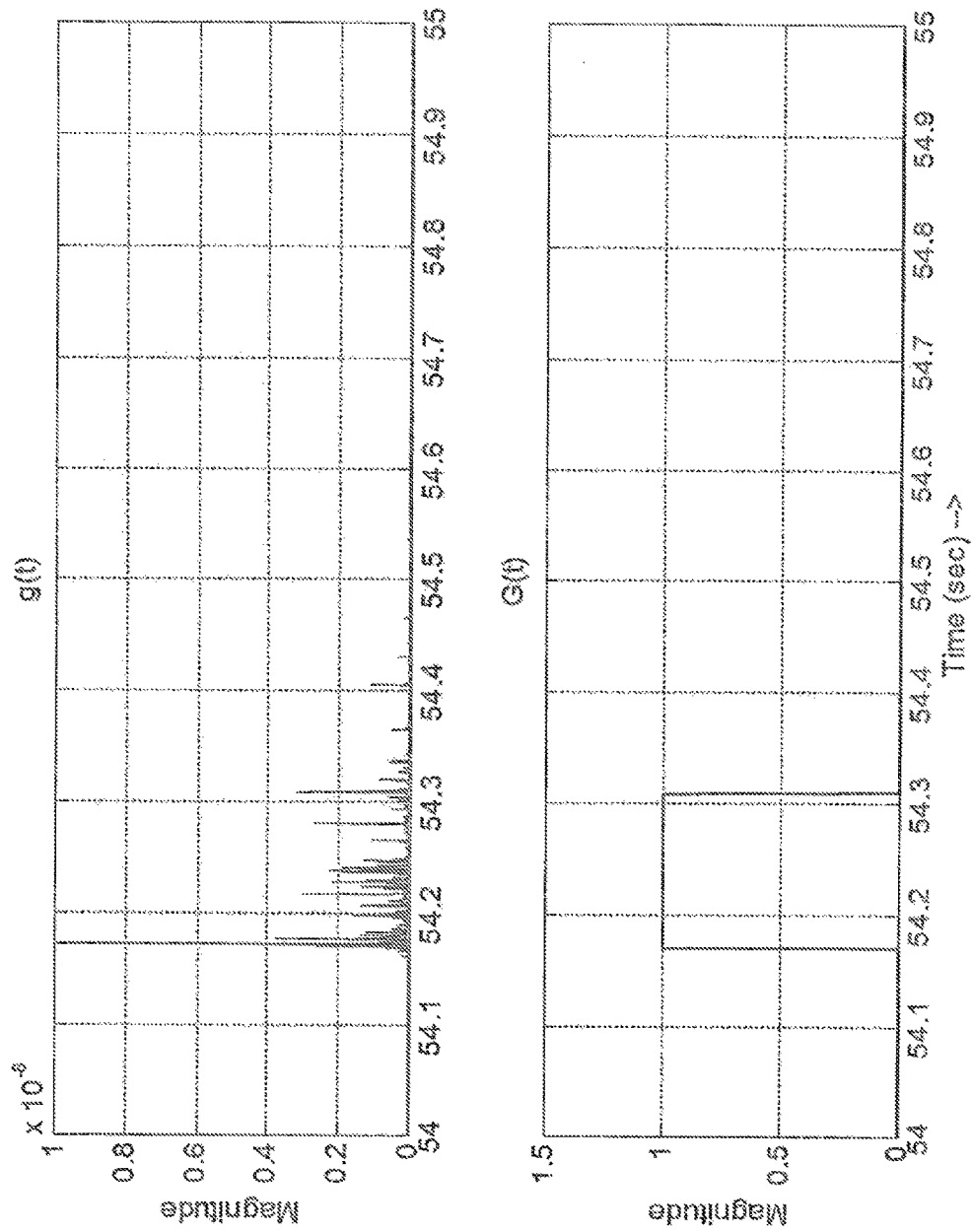
FIG. 7 is time graph illustrating the product of first intrinsic mode functions of all microphones and a box indicating the extent the multipath signals persist.

With reference to FIG. 7, the product of first intrinsic mode functions of all microphones 'g' and the output of the algorithm 'G' above is illustrated in which a pulse 28 is generated. The pulse 28 is shown in FIG. 7 as a function of time on the X axis gives the location of the multipath signals. The transient pulse (muzzle blast) signal occurred just prior to the pulse 'G'.

Figure 8:
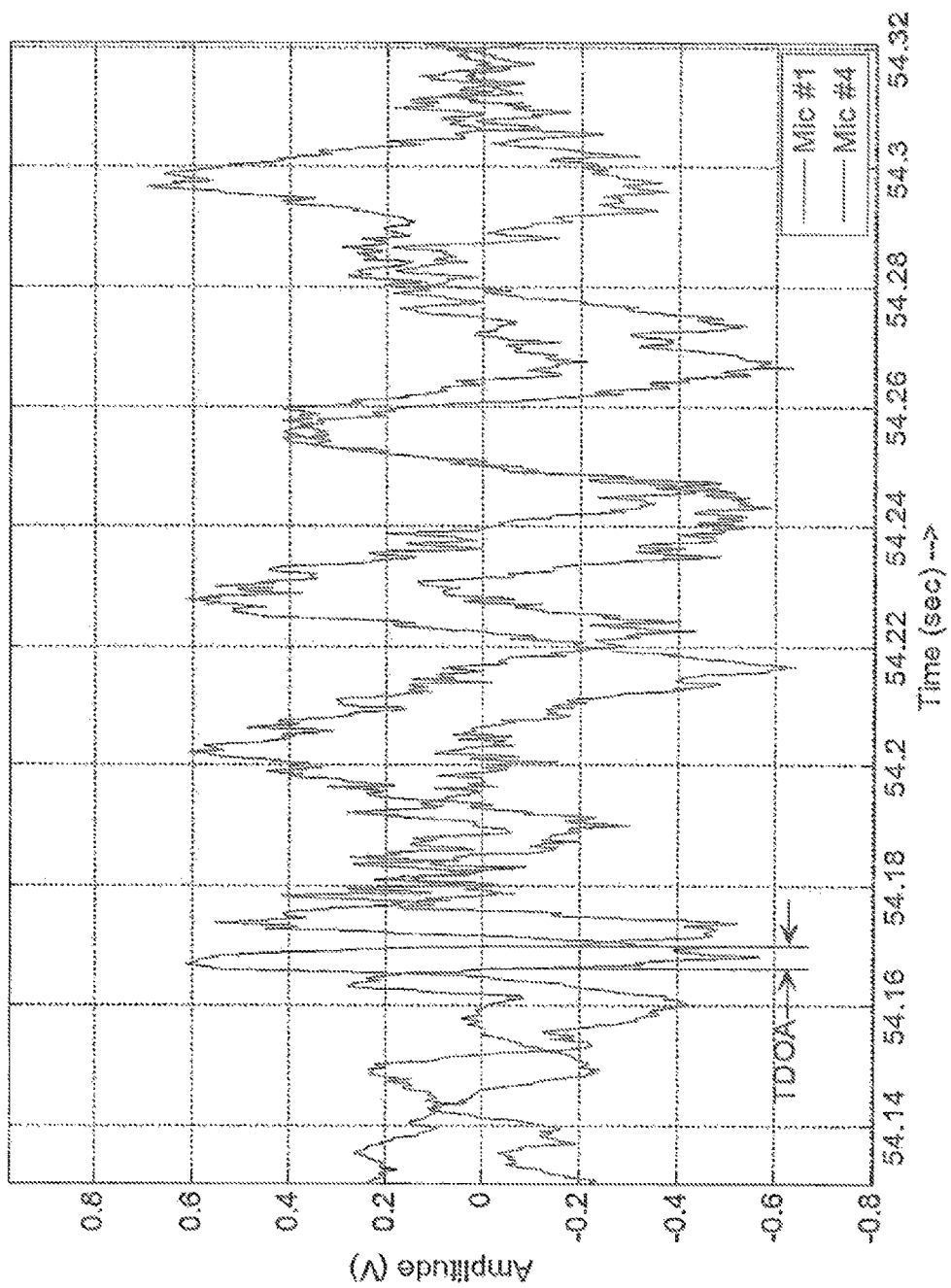
FIG. 8 illustrating the TDOA.

After identification of the location of the transient pulses at step 42, step 42 proceeds to step 43 where the time difference of arrival between each pair of microphones is estimated using the technique called generalized cross correlation (GCC) presented in C. H. Knapp and C. Carter, "The generalized correlation method for estimation of time delay", *IEEE Trans. on Acoustics, Speech and Signal Processing*, Vol. ASSP-24, No. 4, August 1976, pp. 320-327. FIG. 8 shows an exemplary TDOA between two microphones. Once the TDOAs for every pair of microphones are determined the location of the gunfire is identified through multilateration using time difference of arrival (TDOA) of the transient pulses by the microphones 12. Such localization is straightforward and may be performed by the following algorithm.

Let the instant the gun's muzzle blast is emitted to be $t_0$ and the time the signal arrived at the microphone $S_i$ to be $t_i$, then the distance the sound traveled is $$r_i = (t_i - t_0)c, \quad (2)$$

where c denotes the speed of sound. Using Equation 2, the TDOA between two microphones, $S_i$ and $S_j$, is given by $$t_{ij} = (t_i - t_0) - (t_j - t_0) = t_i - t_j \quad (3)$$

and the difference in the distances is $$r_{ij} = (t_i - t_0)c - (t_j - t_0)c = (t_i - t_j)c = r_i - r_j. \quad (4)$$

The signal source must lie on the locus, which keeps the difference $r_{ij}$ constant. The locus defines a hyperbola. If there are at least three microphones, the intersection of the hyperbolas gives the location of the signal source, that is, location of the gun.

The following approach gives the procedure to find the point of intersection of the hyperbolas. Let $S=(x,y)$ denote the location of the sound source to be estimated; the locations of the microphones. $S_i = (x_i, y_i)$ are known. Without loss of generality, the location of $S_1$ is set at (0, 0) (just subtract the coordinates of all microphones with the coordinates of $S_1$ to make $S_1=(0, 0)$). Now, from Equation 4

$$r_{i1} = r_j - r_1$$

$$\text{or } r_{i1} + r_1 = r_i = \sqrt{(x_i - x)^2 + (y_i - y)^2}$$

$$\text{or } (r_{i1} + r_1)^2 = K_i - 2x_i x - 2y_i y + x^2 + y^2 = K_i - 2x_i x - 2y_i y + r_1^2 \quad (5)$$

where $K_i = x_i^2 + y_i^2$ and $r_1^2 = x^2 + y^2$. Equation 4 can be rewritten as $$x_i x + y_i y = -r_{i1} r_1 + \tfrac{1}{2}(K_i - r_{i1}^2). \quad (6)$$

Explicitly writing for all microphones, the above equation becomes $$\begin{bmatrix} x_2 & y_2 \\ x_3 & y_3 \\ \vdots & \vdots \\ x_n & y_n \end{bmatrix} \begin{bmatrix} x \\ y \end{bmatrix} = r_1 \begin{bmatrix} -r_{21} \\ -r_{31} \\ \vdots \\ -r_{n1} \end{bmatrix} + \frac{1}{2} \begin{bmatrix} K_2 - r_{21}^2 \\ K_3 - r_{31}^2 \\ \vdots \\ K_n - r_{n1}^2 \end{bmatrix}. \quad (7)$$

This is in the form of a linear equation $$HX = r_1 G + D, \quad (8)$$

where $X = [x \; y]^T$. The least-squares solution in terms of $r_1$ yields $$\hat{X} = (H^T H)^{-1} H^T (r_1 G + D). \quad (9)$$

Substituting this intermediate result into $r_1^2 = x^2 + y^2$ leads to a quadratic equation in $r_1$. Solving for $r_1$ and substituting the positive root back into Equation 9 yields the final solution for X. This method is called the spherical interpolation.

Once the location of the gunfire has been identified, the processor 18 (FIG. 1) generates the appropriate output signal to the display 20. The war-fighters can then take the appropriate action.

From the foregoing, it can be seen that the present invention provides a system and method for identifying the location of gunfire from an object, such as a moving object. Unlike the previously known systems for identifying the location of gunfire, the present invention is able to extract transient pulses representative of the gunfire even when the transient pulse is buried in noise.

Having described my invention, however, many modifications thereto will become apparent to those skilled in the art to which it pertains without deviation from the spirit of the invention as defined by the scope of the appended claims.

I claim:

1. A method of identifying a location of gunfire from an object comprising the steps of:
   placing at least two spaced apart audio microphones on the object, each microphone producing an output signal representative of all received audio sound,
   decomposing said received audio sound into intrinsic mode functions by using empirical mode decomposition,
   identifying a transient pulse in said intrinsic mode functions for each microphone,
   locating the location of the gunfire from said transient pulses through multilateration using time difference of arrival of said transient pulses by said microphones, and
   displaying said location.

2. The method as defined in claim 1 wherein the object is a moving object.

3. The method as defined in claim 1 and further comprising the step of forming a matrix of said intrinsic mode functions prior to said identifying step.

4. The method as defined in claim 1 wherein said placing step comprises the step of placing at least three spaced apart audio microphones on the moving object, each microphone producing an output signal representative of all received audio sound.

5. The method as defined in claim 4 wherein said locating step further comprises the steps of:
   creating a hyperbola of the sound location for each microphone,
   calculating a location of an intersection of said hyperbolas.

6. The method as defined in claim 5 wherein said calculating step comprises spherical interpolation.

7. The method as defined in claim 1 wherein said identifying step further comprises the step of identifying a transient pulse in a high frequency intrinsic mode functions for each microphone.

8. A system to identify a location of gunfire from an object comprising:
   at least two spaced apart audio microphones positioned on the object, each microphone producing an output signal representative of all received audio sound,
   a processor programmed to decompose said received audio sound into intrinsic mode functions by using empirical mode decomposition,
   said processor programmed to identify a transient pulse in said intrinsic mode functions for each microphone, said processor programmed to locate the location of the gunfire from said transient pulses through multilateration using time difference of arrival of said transient pulses by said microphones, and a display which displays said location.

9. The system as defined in claim 8 wherein the object is a moving object.

10. The system as defined in claim 8 and further comprising the step of forming a matrix of said intrinsic mode functions prior to said identifying step.

11. The system as defined in claim 8 wherein said placing step comprises the step of placing at least three spaced apart audio microphones on the moving object, each microphone producing an output signal representative of all received audio sound.

12. The system as defined in claim 11 wherein said locating step further comprises the steps of:
   creating a hyperbola of the sound location for each microphone,
   calculating a location of an intersection of said hyperbolas.

13. The system as defined in claim 12 wherein said calculating step comprises spherical interpolation.

14. The system as defined in claim 8 wherein said identifying step further comprises the step of identifying a transient pulse in a high frequency intrinsic mode functions for each microphone.

* * * * *